United States Patent [19]

Kos

[11] 4,300,142
[45] Nov. 10, 1981

[54] THERMAL PRINTER

[75] Inventor: Steven Kos, Kanata, Canada

[73] Assignee: Northern Telecom Limited, Montreal, Canada

[21] Appl. No.: 121,704

[22] Filed: Feb. 15, 1980

[51] Int. Cl.³ .............................................. G01D 15/10
[52] U.S. Cl. ......................... 346/76 PH; 346/139 R; 400/120
[58] Field of Search ...................... 346/76 PH, 139 R; 400/120

[56] References Cited

U.S. PATENT DOCUMENTS 3,951,247 4/1976 Montanari ........................... 400/120
3,967,092 6/1976 Conta ......................... 346/76 PH X
4,235,555 11/1980 Aprato ................................ 400/120
4,238,806 12/1980 Bovio .............................. 346/76 PH
4,248,147 2/1981 Zenner ........................... 400/124 X Primary Examiner—Joseph W. Hartary
Attorney, Agent, or Firm—Stuart L. Wilkinson

[57] ABSTRACT

A printer has a print head on which a series of individually-heatable printing resistors are linearly arranged. The print head is mounted on a carriage for stepwise reciprocation in a direction parallel to the line of resistors, paper being stepwise movable in a transverse direction. The printing sequence is designed to permit the carriage stepping motor to be operating in the slew mode for maximizing print speed.

22 Claims, 6 Drawing Figures

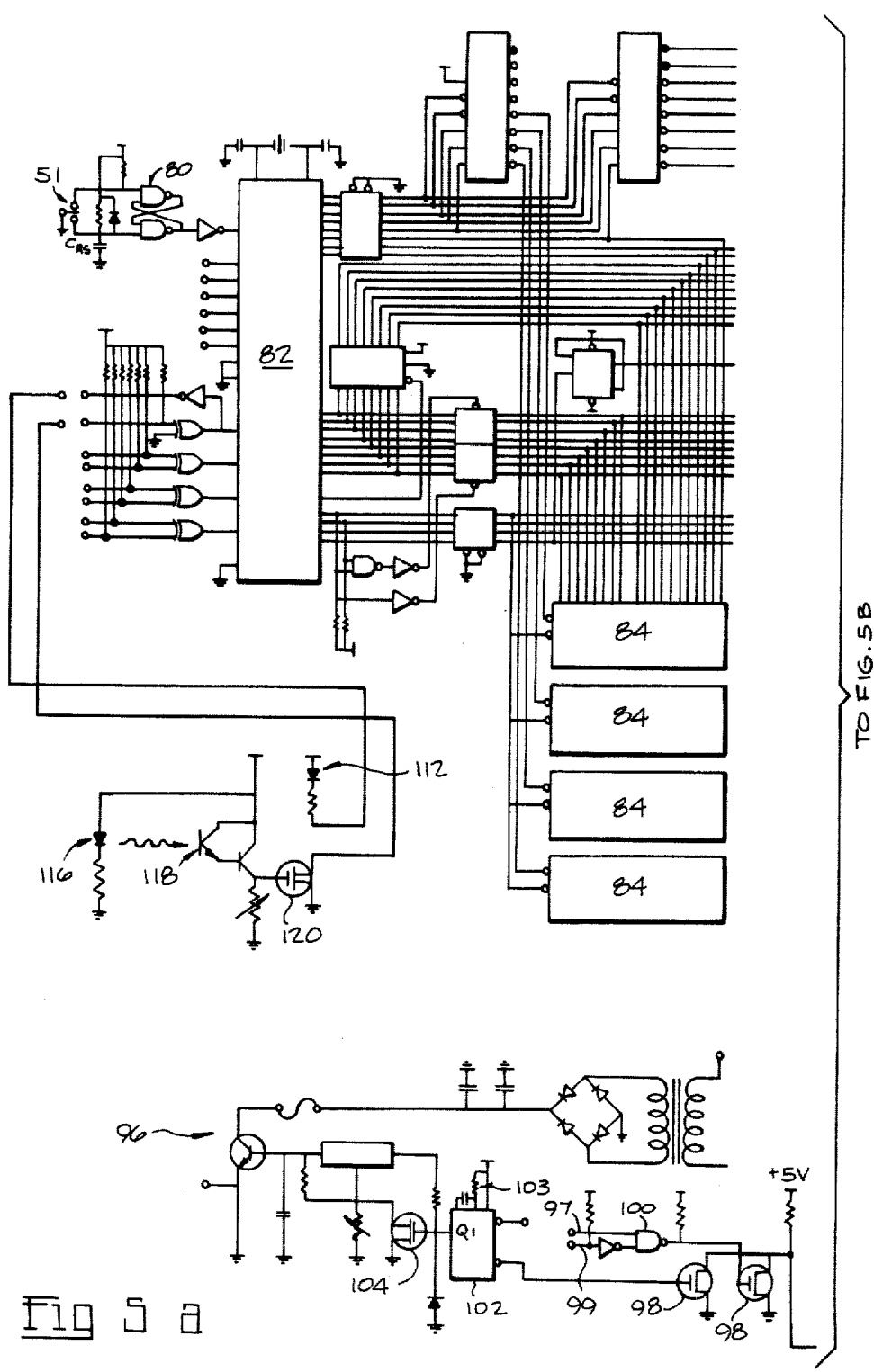

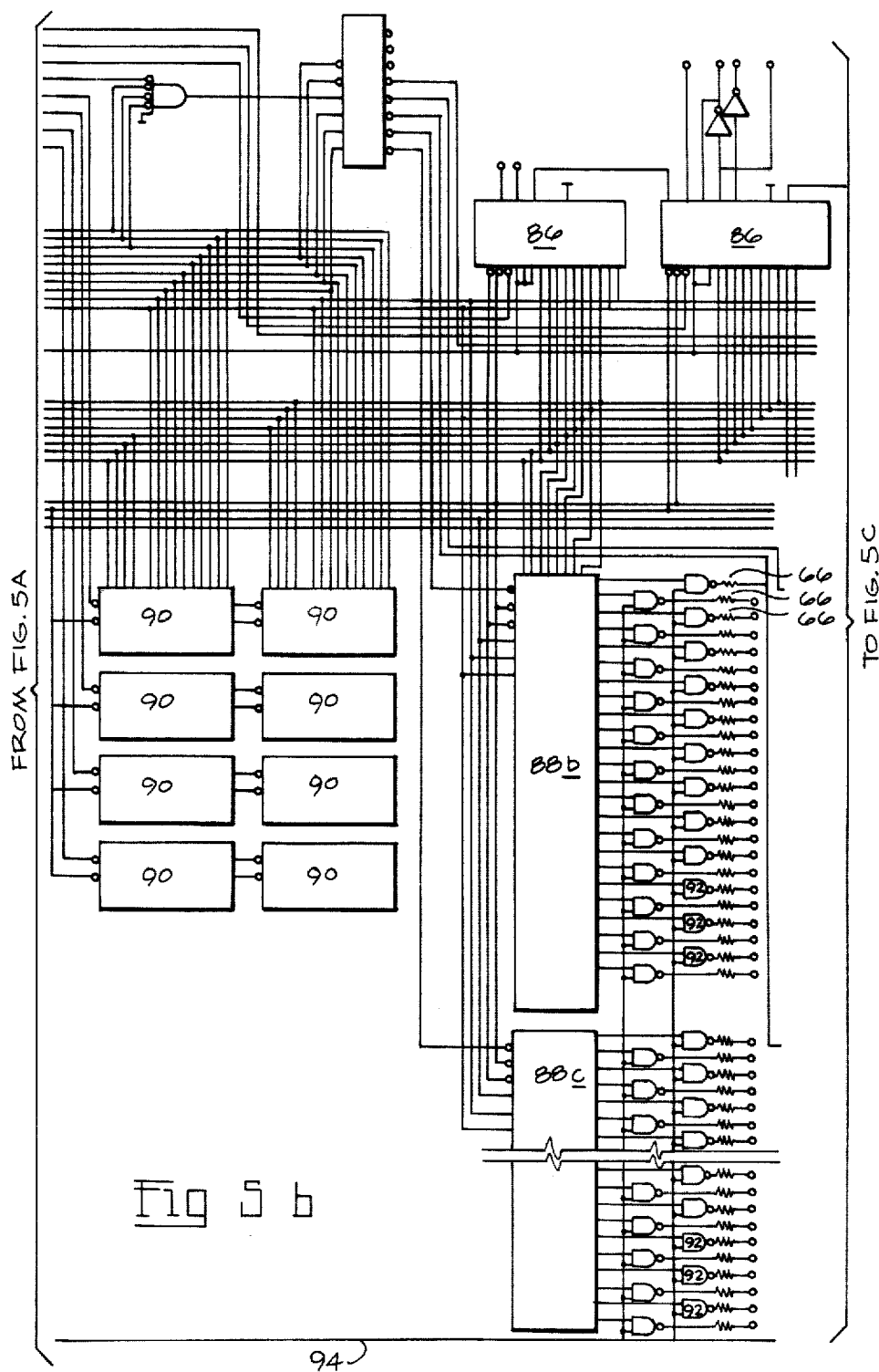

THERMAL PRINTER

This invention relates to thermal printers having a reciprocating print head.

Various types of printer are used for printing graphics and alphanumerics. Typical examples are ink jet printers, impact printers and thermal printers. To take advantage of high bandwidth obtainable using, for example, fiberoptic links, modern printers must have the capacity for high print rate. However, there is also the somewhat conflicting demand for high resolution. Maximum character rates of these three types of printer are approximately as follows:

Ink jet printer—600
Impact printer—300
Thermal Printer—600

Impact printers, which use the typewriter principle of a hammer acting through a print ribbon, produce a considerable amount of noise and, consequently, aural discomfort.

Ink jet printers have proved popular because, in addition to offering rapid print out, they are quiet. However they require complex ink deflection schemes and it is difficult to site ink ejection orifices close together. Moreover, there is a problem of definition resulting from an ink mist than can result, especially when operating at high print speeds. Finally, great care must be taken to monitor changes in ink viscosity caused by evaporation from the circulating ink in order that ink ejection nozzles do not become blocked.

Thermal printers, which use Joule effect heating of resistors, provide one of the most simple printer constructions but, especially in the case of matrix-addressed printers, they are relatively slow and are prone to deterioration of contrast owing to stray currents appearing at non-selected print resistors.

According to the invention there is provided a thermal printer comprising a print head including a series of individually addressable spaced print resistors and conductive means for selectively applying print current pulses to produce Joule effect heating thereof, said print head mounted on a carriage; a carriage stepping means for driving the carriage stepwise in a first direction; means for mounting thermally sensitive paper adjacent the print head; paper stepping means for driving the paper stepwise in a second direction perpendicular to the first direction; and means for synchronizing application of said current pulses and stepwise drive of said carriage.

An embodiment of the invention will now be described by way of example with reference to the accompanying drawings in which.

Figure 1:
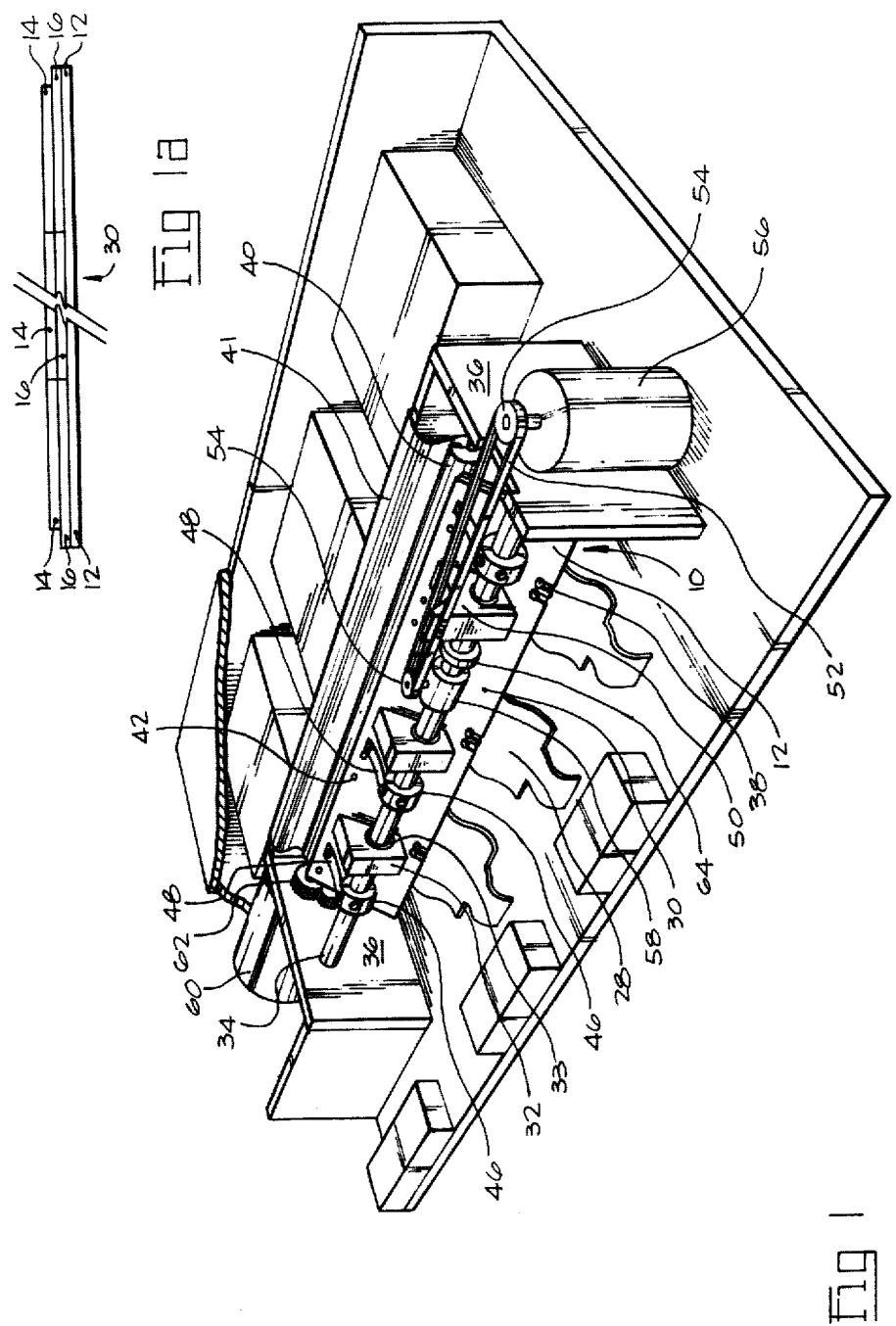
FIG. 1 is a perspective view of a moving head printer.
Figure 2:
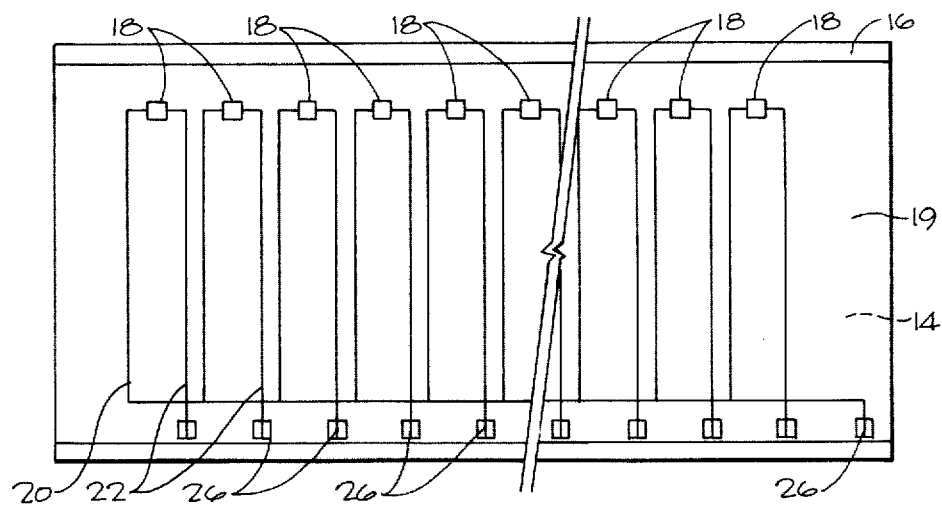
FIG. 2 is a plan view of a thermal print head for use in a moving head printer according to the invention.

Considering FIG. 1, a reciprocal carriage 10 of a moving head thermal printer has a thermal print head 12 mounted on it. The print head 12 includes 3" long electrically insulating substrates 14 of ceramic or similar material. Each substrate is affixed by a conducting paste to a backplate 16 made of a high thermal conductivity material such as aluminum, the backplate 16 functioning together with the rest of the carriage 10, as a heat sink. As shown in FIG. 2, spaced along each substrate 14 are a series of 28 rectangular thick film resistive deposits or print resistors 18 of dimensions about 10 to 15 mil sq. Each of the resistances bridges a gap between a common bus lead 20 and conducting leads 22, the leads 20 and 22 being thick-film deposited gold. Over the top of the leads 20, 22 and the print resistors 18 is a glaze 19 which acts both to protect the print resistors 18 and leads 20, 22 against wear and to reduce friction between the substrate top surface and thermally sensitive paper 24 relative to which the print head 12 moves.

The leads 20, 22 extend to contact pads along the bottom edge of the substrate 14, to which pads are soldered tinned end contact regions of ribbon cables 28 (FIG. 1) having a series of copper conductors on a flexible Mylar$^R$ base. In order to cushion the solder joints against dynamic shock, the solder joints are coated with epoxy.

In an alternative embodiment (not shown), a beryllium-copper spring plate is attached to the substrate so that a plastic packing strip of the same thickness as the substrate is sandwiched between the backplate and the spring plate. The ribbon cable is fixed to the substrate and a series of spring fingers forming part of the spring plate locate over individual leads on the ribbon cable and press them into electrical contact with the contact regions on the substrate.

Three of the aluminum backplates 16, with print head substrates 14 attached, are clamped to the carriage 10. The carriage has a baseplate 30 to which is attached brackets 32, by means of which the baseplate is mounted on a cylindrical rail 34 extending between walls 36. The baseplates 16 are clamped to the carriage baseplate 30 at slots 38 which permit reorientation of the individual substrates. Set screws 42 which extend through the baseplate 30 permit alternation of the backplate camber. Using three separate substrates 14 ensures that the possibility of inferior performance through warpage is reduced. Thus warpage of a particular substrate can be corrected without having to change the orientation of the other substrates. In addition, if one of the print head modules fails electrically, replacement is cheaper and easier than replacing a 9" long print head.

The positional relationship between the print head resistors 18 and thermally sensitive paper mounted on the roller platen can thus be adjusted to ensure that the print resistors are accurately aligned and the print solidity throughout the series is uniform. The roller platen 40 is 10" long about ¾" in diameter and made of 34 durometer rubber. Thermally sensitive paper is fed onto the roller platen via a bracket 41 which is mounted between the walls 36 and embraces the roller platen along its rear and bottom surfaces. The bracket supports one component of a light emitting diode-photo transistor combination (not shown) to indicate the need for further paper.

Each of the brackets 32 incorporates a ball bearing or nylon bush 33 permitting the carriage to be reciprocated back and forth along the rail. Also fixed to the rail are several brackets 46 from which extend beryllium-copper springs 48. These act on the baseplate 30 to bias the print head with a predetermined pressure onto the roller platen 40. A rubber grommet 64 is slidably mounted on the cylindrical rail 34 adjacent one of the brackets 32.

One of the brackets 32 has an upstanding projection 50 to which is bolted a steel band 52, the band 52 extending around pulleys 54 mounted respectively at a stepping motor 56 and at a pulley support 58 fixed to the rail 34. The steel band is used to convert rotary motion at the stepping motor into linear motion of the carriage, the band 52 being short in order that at each stepping cycle and, more importantly, at each print head reversal there is negligible extension of the band which might otherwise upset the stepping mode to be discussed presently. The print head stepping motor 56 is mounted adjacent one of the walls 36, another stepping motor 60 for stepwise rotation of the roller platen 40 being mounted adjacent the other wall 36. Reduction gearing 62 ensures that stepwise rotation of the motor 60 is converted into a 5 mil/step circumferential movement of the roller platen.

One example of a stepping motor used for print head stepping is manufactured by Sigma Instruments Inc., under specification 20 2220D200-F6. Although not shown in the drawings the stepping motor consists essentially of a stator, which has a number of wound poles, each pole having a number of teeth as a part of its flux distributing member, and a rotor which is cylindrical and toothed. The motor operates by means of the interactions between rotor magnet biasing flux and magnetomotive forces generated by applied current in the stator windings. If the pattern of widing energization is fixed, there is a series of stable equilibrium points generated around the motor. The rotor moves to the nearest of these and remains there. When the windings are excited in sequence, the rotor follows the changing pattern of equilibrium and rotates in response to that changing pattern.

In standard operating mode, the carriage 10 is moved stepwise 5 mil at a time and a current pulse is applied to selected print resistors 18 at each step, depending on the identity of characters to be printed. The carriage is stepped a total distance equal to the spacing of adjacent print resistors whereupon the thermally sensitive paper 24 is stepped 5 mil in a direction transverse to the carriage stepping direction by the motor 60.

The stepping motor 56 is used in the so-called slew mode which can best be understood by considering what happens when the stepping motor rotor is halted at the end of each carriage step. The rotor does not stop dead, but oscillates for a brief period. A torque minimum occurs when the stepping ampliptude maxima are coincident with the amplitude minima of this oscillation. As the stepping frequency is increased, the slew mode is entered, stepping and oscillation come into phase, and torque is restored.

The motor identified previously has been operated with a stepping rate of 1500 steps/sec. Rapid operation of the stepping motor at this and higher rates up to 4000 steps per second is made possible by ensuring that the four phases of drive current necessary for motor synchronization are accurately derived and temporally related and by ensuring that rise and fall times for drive current to the stepping motor 56 are minimized. The method by which these are achieved is described in greater detail presently.

Figure 3:
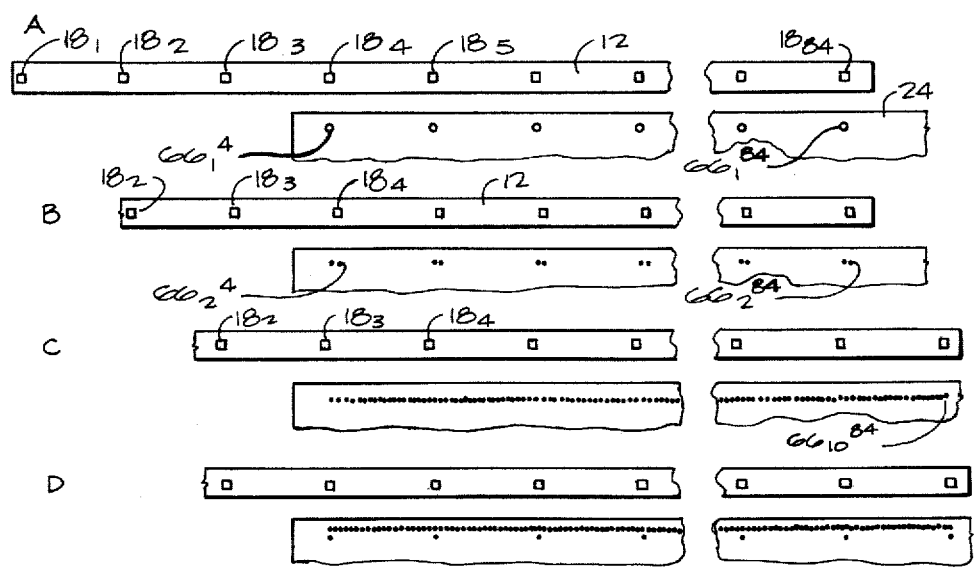
FIG. 3 shows, for one operating mode, the position of the print head and pels printed thereby as a function of time.

Considering FIGS. 2 and 3, the length over which the series of print resistors extends is greater than the length of a line of pels 66 to be printed. The print head 12 has a total of 84 print resistors, each print resistor 18 separated from its next adjacent print resistor by 100 mil giving a total print head length of 8.4". The print head is used to print a line of up to 1600 pels on thermally sensitive paper, the 1600 pels having a total length of 8" (i.e. 200 lines per inch). The 0.4" difference between these two lengths enables faster print-out since it permits prolonged operation of the print head stepping motor 56 in the slew mode.

At each print head reciprocation, the motor direction is reversed thereby destroying the slew mode and requiring that the stepping motor wind up through the minimum torque regime again. The extended print head length permits more than one line to be printed without interrupting slew mode operation. Thus as shown in FIG. 3, at any time, three of the print resistors are not addressed by print pulses. For illustrating convenience, relevant parts of the print head 12 and the thermally sensitive paper are shown vertically separate although in practice the print head 12 is hard up against the paper 24 to ensure localized heat transfer; in addition, in this description, data for printing is assumed to be a vertical series of horizontal lines. FIGS. 3a shows the printing of pels $66_1{}^4$ to $66_1{}^{84}$ by each of the print resistors $18_4$ to $18_{84}$. Similarly FIGS. 3b and 3c show the printing of pels $66_2{}^4$ to $66_2{}^{84}$ and FIG. 3c shows the printing of pels $66_{20}{}^4$ to $66_{20}{}^{84}$ thereby completing one line of pels. At this juncture the thermally sensitive paper is advanced one line by the stepping motor 60, the stepping motor 56 meanwhile remaining in its slew mode. Thereupon another line of pels is printed using print resistors $18_3$ through $18_{83}$ (FIG. 3d). The paper is then advanced another line to print using only print resistors $18_2$ to $18_{82}$ and advanced a final line to print using only print resistors $18_1$ to $18_{81}$.

Each lateral step of the carriage during slew mode operation is executed substantially faster, 800 microseconds for 1250 lines per second printing, than the period for stepping the paper 24, about 1.2 mS. This is a simple matter for fixed field printout where characters are printed directly below one another so that vertically aligned spaces are assured. Paper feed can than be performed during a period that each of the print resistors 18 is in vertical alignment with one of the spaces.

For graphics or block printing where predictable vertical gaps are not available, the total horizontal stepwise movement during the paper feed period is assessed and appropriate compensation is made when converting input data to print pulses.

Once the print head 12 has reached the full extent of its right hand travel, drive to the print head 12 is reversed. The print head is then stepped from right to left to print a subsequent four lines of pels 66. As an alternative, the print head can fly back to its original position without printing but this is not preferred since the flyback period, which may be on the order of 1.6 mS for a 20 step flyback, is wasted. On the other hand, the only change required for printing from right to left is that data be reverse loaded into a buffer memory and this reversal can be performed fairly rapidly. Indeed, this illustrates a further advantage of the elongate print head 12 in that software controlled reversal of the data input direction need only take place every four lines rather than every line, thereby reducing processing time. Obviously, the step frequency of the motor 56 is somewhat slower while it is in the accelerating mode than when it reaches the slew mode. To compensate for this, leading edges of the print pulses and the step pulses are synchronized.

Although the extended print head 12 has been described in terms of extra print resistors permitting four line printing in uninterrupted slew mode, the particular number of extra print resistors is a matter of choice.

Figure 4:
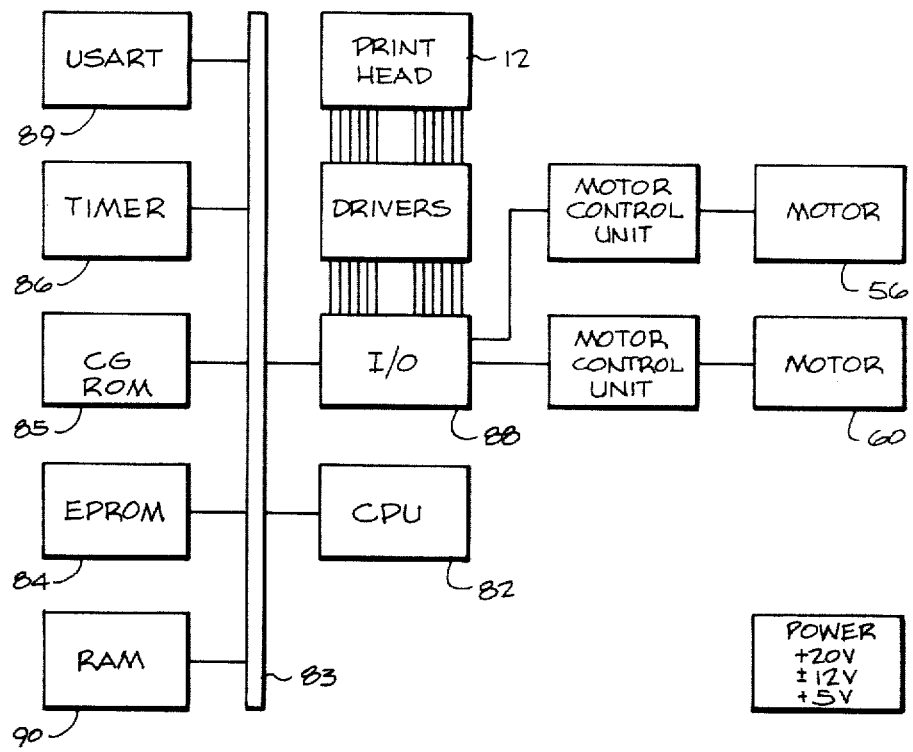
FIG. 4 is a block schematic diagram of a control circuit for the moving head printer.

Turning to FIG. 4 there is illustrated in block schematic form a control facility for the thermal printer. The control facility includes a central processing unit (CPU), 82 connected to a bus 83. Also connected to the bus are a universal synchronous asynchronous receiver transmitter (USART) 89, for receiving data from modems, typewriter, video or facsimile terminals and for transmitting that data via the CPU to a random access memory (RAM), offering 4Kbytes of storage, the actual memory capacity depending on resolution and speed desired. Also connected to the bus are timers, 86 a character generator read-only-memory (CGROM) 85 from which, for example, 5×7, 7×9 and helvetica characters are derived from encoded data, and an electrically programmable read-only-memory (EPROM) 84, for controlling overall operation. Also controlled by the CPU are parallel input/output (I/O) ports which drive control logic to the print head stepping motor 56, the paper feed stepping motor 60, and the print resistors 18. A power supply to the control facility provides a 20 volt supply for the print pulses and ±12 volts and +5 volts for the logic.

The printer which is shown in greater detail in FIG. 5 operates in the following general manner.

When power is first applied, the system is automatically reset by the charging action of a capacitor $C_{RS}$ which switches a flip-flop 80 and delivers a reset pulse to the CPU 82. Switch S1 is then placed in an operating position. The CPU can be subsequently reset during operation by switching switch S1 to its reset position.

The CPU 82 then starts executing program code according to software stored in the EPROM 84 which controls printer operation and contains the CGROM pattern information for the different print styles.

The CPU 82 first initializes all timers 86 and the I/O ports 88, selects the font according to the prevailing position of a front panel switch (not shown), and resets the carriage position via stepping motor 56. To reset the carriage, the stepping motor 56 is instructed to step as far left as possible. The motor keeps on stepping a sufficient number of steps to ensure that, regardless of the carriage start position, the carriage reaches a position in which the rubber grommet 64 is hard up against pulley support 58. The carriage is then moved back a predetermined distance to a start position about which it can oscillate. Subsequent control is provided by the timers 86.

The CPU 82 then waits either for ASCII serial data from the USART 89 which is controlled by one of the timers 86 or for parallel data from I/O port 88a. Characters received are placed in a buffer in a RAM 90 until a carriage return character is received. The CPU 82 looks up the bit patterns from the EPROM 84 for those characters stored and places those patterns in another buffer area of the RAM 90. The CPU then outputs the appropriate 84 bits for a line of print to the I/O ports 88b through 88e, sets the print timers 86 for the required print time, (1.5 mS), at the selected print resistors 18, and proceeds with other tasks such as reorganizing data, collecting more ASCII characters etc.

When gates controlling the print resistors receive an enable pulse, those gates controlling print resistors 66 selected by the I/O ports 88 are switched on. Each gate 92 incorporates a transistor having its collector connected to a print resistor. When the gate 92 is switched, this transistor is rendered conducting, the 20 volt supply then going to ground through the print resistor to heat it to print temperature. The print pulse is applied to line 94 through a protection circuit 96 which turns off the 20 volt supply if either the +5 volt supply or the logic fails. Thus, series connected FET's 98 are normally conducting to maintain line 94 grounded and the open collector driver transistors off. When pulses are received at the supply enable and print stroke terminals 97 and 99, NAND gate 100 goes low thereby switching off the FET's 98 and the +5 volt supply is applied to gate 92. The low from gate 100 is also applied to monostable vibrator 102 which sets a maximum permissible print period determined by a resistor capacitor network 103. At the end of this period, if the line 94 has not gone low, output Q1 from the monostable 102 acts through FET 104 to clamp the 20 volt supply to ground. This is done to minimize the chance of the print head being damaged through overheating. The blocking condition is cleared by an instruction from the CPU whereupon the CPU moves the carriage one step. A number of outputs from I/O port 88e are used to provide timing for the stepping motors 56 and 60. To speed up onset of slew mode of the stepping motor 56, accurate timing of the four phases of drive current to the motor must be achieved and rise and fall times of current to the motor must be minimized. The four phases required are generated by timing logic 106 (IC's AA 1027). Windings of carriage stepping motor 56 are driven through rapidly acting VMOS FET's 110, while those of paper stepping motor 60 are driven somewhat more slowly through relatively slower acting bipolar transistors 112. After each print step, the CPU loads in the next 84 data bits and sets the timer again. This cycle of operations continues until the entire character line is printed whereupon the stepping motor 60 steps and the printer is ready to print another line of ASCII characters.

Special control characters embedded in the ASCII data can force the CPU to use special fonts, to advance paper, to print raw data for facsimile, to change resolution, etc., by overriding front panel selector switches (not shown).

The CPU provides drive pulses for reversing carriage direction and advancing paper when so required. Paper may be rapidly advanced any time by pressing the front panel button 114 connected to a terminal of I/O port 88a. The paper, which is mounted within curved bracket 41, normally blocks light from a LED 116 unless the paper needs replenishing in which case the light turns on a bipolar transistor 118 and FET 120 to inform the CPU of the condition and to turn on a front panel LED 112.

I/O chip 88e has a terminal connected to a FET 126 which controls an alarm comprising a piezoelectric crystal vibrator 128 which operates under certain fault conditions. This chip also has an 8 bit parallel input port, together with hand-shaking and baud select terminals for the USART.

Other terminals connected to front panel switches (not shown) provide the capacity for changing font, resolution, etc., although as indicated previously selection can be overcome if incoming data carries an instruction to that effect.

The printer of the invention offers great flexibility mainly, but not exclusively, through the agency of software control.

In a standard operating mode, the printer prints pels of size 7 mil×7 mil on 5 mil centres. However, by altering the ratio of print rate to step rate, (either the print head step rate or the paper feed step rate, or both), the pring characters can be made to appear more or less solid. Alternatively, the gear ratio of the drives from the stepping motors 56 and 60 can be altered by modifying the drive gears 62 or pulleys 54.

As an alternative to prolonging the period in which the stepping motor 56 undergoes continuous slew mode operation, the advantages of which were discussed previously, the elongate print head 12 can, with appropriate software control, be used instead to achieve large or block printing of improved appearance. Thus each print resistor 18 has its own print signature; i.e. for a particular pulse intensity and duration, a particular resistor prints a pel which is visibly different from that printed by another print resistor subjected to a pulse of the same intensity and duration. Thus, if a block character is printed partly by one print resistor and partly by another, the resulting contrast within the character can be aesthetically displeasing. Considering again FIG. 3, instead of each of the print resistors traversing and printing 100 mil, (the distance between adjacent print resistors 18,) and then the paper being advanced, the printer is operated to have each print resistor print over any length up to 400 mil in one line. If the block alphanumeric is of the appropriate size and position, then it can be completely printed by one of the 84 print resistors. The neighbouring print resistors which would print the block alphanumeric in standard operating mode, are disabled. With appropriate software control, the horizontal line scan of a print resistor can thus be made shorter, longer or displaced from its usual path to produce uniform print density throughout the character. Obviously, this density control is at the expense of some operational speed.

Figure 6:
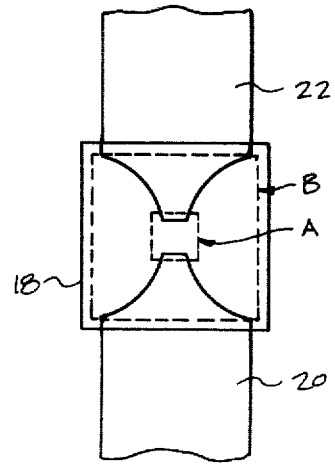
FIG. 6 is a view to an enlarged scale of a print resistor of the FIG. 2 print head.

Referring back to FIG. 2 and considering the enlarged scrap view of FIG. 6, the individual print resistors 18 are rectangular and extend over both the region between shaped end parts of the conducting leads 20, 22 and over the end parts themselves. The end parts are roughly cuspate in shape in order to permit the heating effect to be localized (4 mil sq.) as in area A, or broadened (10 mil sq.) as in area B, the normal pel area being about 7 mil square. Thus depending on resistive printing material resistivity and thermal conductivity, then by variation of electrical pulse height or duration, the solidity of print can be varied. A change in pulse duration is preferred to a change in pulse height since the latter might produce temperatures that are so high that they have a destructive effect on the thermal resistors. Although a variety of thermally sensitive papers can be used with the moving head printer, an example shown to be satisfactory is supplied by the Nashua Paper Corporation under specification number 364067-4.

By increasing the print pulse duration even further, the pel can be made to extend into a subsequent line of print. This is very useful for rapid presentation of large block graphics or alphanumerics where the software can look ahead to determine a region of dense print and can increase the print pulse duration accordingly. Pel lines which have already been printed by virtue of printing overlap from the previously printed line or lines can then be skipped. Clearly, the boundaries of the enlarged pels are most diffuse than those of standard sized pels so, if normal resolution is desired, the printer must be returned to its normal print mode for printing the block character perimeter, but this too is readily accomodated by software control. Using similar control, if there are large areas in which no printing is to occur, then the paper feed mechanism can be operated at a more rapid rate in slew mode to produce so-called "white-skipping"; similarily, if desired, the print head itself can be made to step prematurely to the next adjacent line.

Frequently it is found that a particular print resistor 18 prints lighter or darker than the others in the series. To compensate for this, software control can be used to ensure that a particular print resistor receives a pulse which is either of different intensity or duration as compared with pulses to the other print resistors.

These operating practices save time which can be more advantageously used in printing and demonstrate once again the versatility of the thermal printer-moving head combination.

Another advantage of the moving head thermal printer is that fabrication of a modular print head is easily accomplished. In matrix thermal printers in which, typically, a bar resistor or closely located individual print resistors are selectively addressed through the agency of an XY matrix of conductors, a modular print head structure is difficult to achieve because there is inevitably a gap between even the most highly polished ends of a pair of laterally abutted modular parts. In practice it is impossible to achieve a separation of less than 5 to 10 mils so a white gap results which detracts from print uniformity. With a moving head system, the abutment gap can easily be made less than the print resistor spacing. Actual spacing information can be stored and step and printing structures modified accordingly.

Considering a stepping motor which has a stepping period of 2 mS of which about 1200 micro-seconds is used in heating and about 800 micro-seconds in cooling, then the total line print time for the 84 print resistors to print a 1600 pel line is 40 mS. For a stationary head printer, if a line of 1600 crosspoints is addressed by a matrix of 40 column conductors and 40 row conductors, addressing each of one conductor type takes at least 2mS and consequently scanning the total matrix takes 80 mS which is an increase of 40 mS over the time for the moving head printer to print 1600 pels.

Most thermally sensitive papers incorporate minute distinct globules of two chemicals which, in combination, produce a dye. These chemicals lie in a wax matrix and combine when the wax is melted at high temperature —375-390° C. in the case of the Nashua paper mentioned previously, the actual temperature depending somewhat on the duration of heating. When a particular print resistor is activated, there is a tendency for the resistor to adhere to the thermally sensitive paper at the pel position. There is consequently an irrating noise on separation. In the moving head printer described, there can be a miximum 84 "sticky" pel position at each paper-print head movement compared with a maximum of 1600 "sticky" positions for the 40×40 matrix printer mentioned previously. The moving head printer thus offers quieter operation.

Although the resistors themselves reach a temperature of up to 390° C., the overall temperature of the heat-sink baseplate 16 is found to be in the neighbourhood of 50° C., some air cooling occuring from the movement of the carriage 10. Although the stepping motor 56 and 60 are not, of course noiseless, stepping motors can be obtained which are practically inaudible, compared to noise originationg from paper-print head separation.

Many benefits of the moving head thermal printer, as compared with the conventional XY matrix printer, accrue from the feature of individual addressing of print resistors, that is, the electrical lead 22 to a particular print resistor 18 is not shared by other of the print resistors 18.

Firstly, grey scale can be obtained merely by appropriate selection of print pulse intensity or duration. There is consequently no need to practice the technique of dithering which has been used to obtain grey scale with matrix addressed graphics. In dithering a particular pel to be printed is assigned a grey scale equivalent depending on the state of those print resistors immediately surrounding the resistor which is to print that particular pel. As might be expected, a complex control circuit is required in order that print resistors of an XY matrix printer can have this grey scale flexibility. Moreover resolution is worse than that obtainable with individual addressing.

Figure 5C:
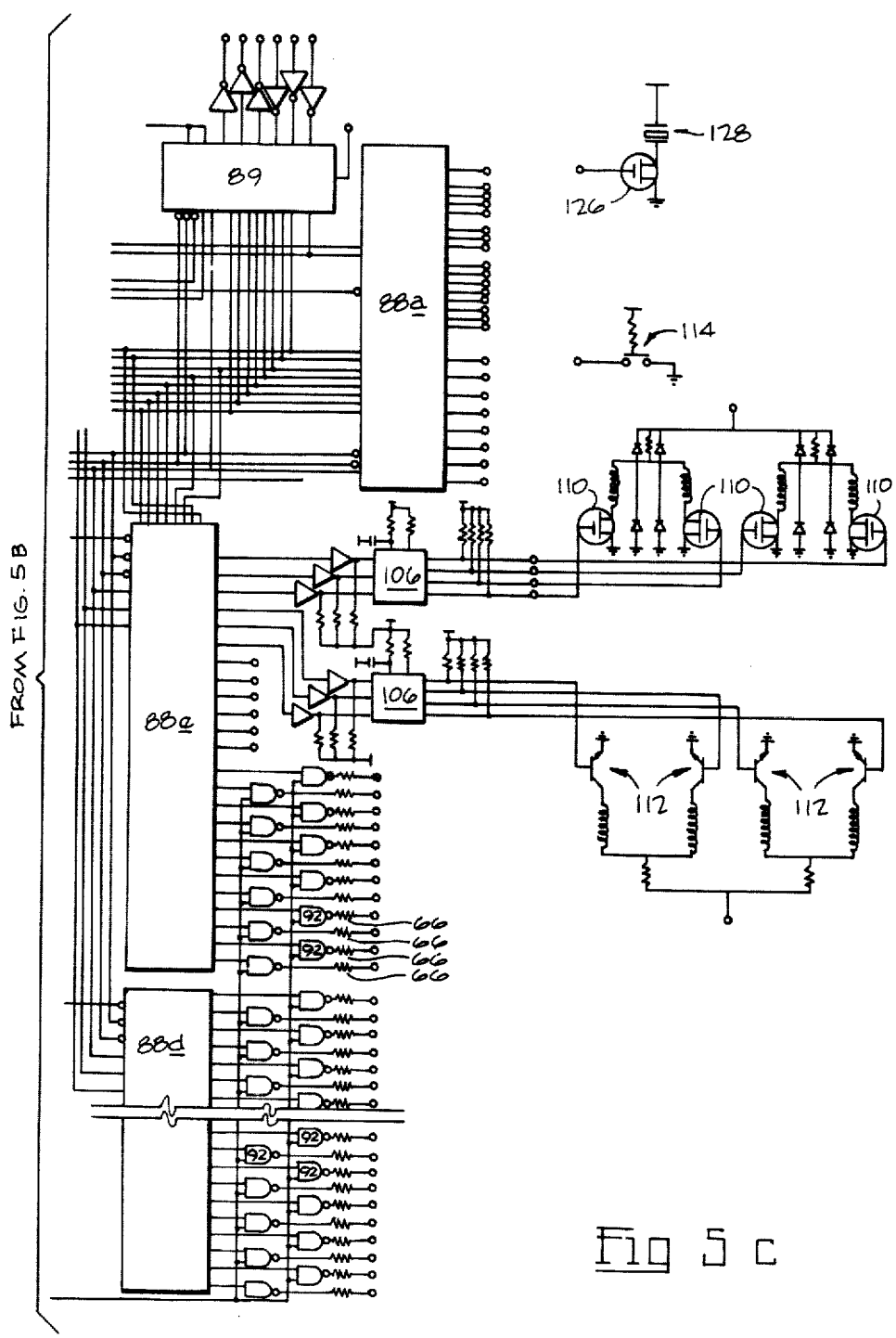
FIG. 5 is a more detailed representation of the FIG. 4 circuit.

A second advantage of individual addressing is apparent from the circuit diagram of FIG. 5 together with the conducting lead patterns of FIG. 2. Thus, when a particular print resistor is activated, there is no current path through which any other non-selected print resistors may be inadvertantly partially activated by loop currents. In conventional matrix printers, the problem of loop currents is a perennial one and all manner of unidirectional current devices have been used to overcome the problem-at a considerable premium in cost and print head lead complexity.

The moving head printer has a further advantage in that all the conductors can be held at a constant voltage, 20 V, thus obviating the need for control transistors for these lines. Control transistors are required only to selectively ground the conducting leads 22. In an XY matrix printer in which, say, data is applied to all of the rows of conductors, and crosspoint heating elements are activated in response to trigger pulses applied successively to each column conductor, switching transistors are required on both the column conductors and the row conductors, thereby entailing further expense and complexity.

What is claimed is:

1. A thermal printer for printing lines of print up to predetermined line length, the printer comprising:
   a carriage;
   a print head mounted on the carriage;
   a series of individually addressable print resistors formed on the print head, the series of print resistors extending linearly in a first direction and having an agreggate span greater than the predetermined line length, adjacent resistors having a predetermined spacing;
   conductive means for selectively applying print current pulses to the print resistors to produce Joule effect heating thereof;
   a high speed stepping motor for driving the carriage stepwise in the first direction up to a total distance greater than said predetermined resistor spacing;
   means for mounting thermally sensitive paper adjacent the print head;
   a second stepping motor for driving the paper stepwise in a second direction perpendicular to the first direction; and
   circuit means for temporally relating application of the print current pulses, operation of the high speed stepping motor, and operation of the second stepping motor.

2. A printer as claimed in claim 1 in which the means for applying current pulses selectively to the print resistors includes a common supply voltage bus connected to one node of each print resistor.

3. A printer as claimed in claim 2 in which the means for applying current pulses selectively to the print resistors includes an open collector driver for selectively grounding the other node of each print resistor.

4. A printer as claimed in claim 1 wherein said print head comprises at least one insulating substrate, and said print resistors are composed of thin of thick film resistive material deposited on the substrate.

5. A printer as claimed in claim 4 wherein each substrate is mounted on a heat sink by means of a thermally conductive adhesive.

6. A printer as claimed in claim 5 in which the conducting leads have contact portions with the print resistors, said contact portions being generally cuspate in shape.

7. A printer as claimed in claim 4, further comprising a roller platen for supporting the paper, and means for adjusting orientation of said substrate relative to the roller platen.

8. A printer as claimed in claim 6, further comprising bearing means for mounting the carriage for stepwise motion along a rail.

9. A printer as claimed in claim 8, further comprising spring means fixed relative to said rail and acting on the carriage thereby to bias the print head against the roller platen.

10. A printer as claimed in claim 1, in which the carriage stepping motor has a rotor and a stator, said motor operable to produce stepwise rotation of the rotor, and drive means interconnecting the rotor and the carriage to convert rotor rotation to longitudinal movement of the carriage.

11. A printer as claimed in claim 10 in which the drive means comprises a first pulley mounted coaxially with the rotor, a second pulley remote from the first pulley and a continuous band extending around the pulleys, the band having a portion thereof fixed to the carriage.

12. A printer as claimed in claim 10, in which the rotor has a screw threaded extension rotatable within a fixed internally threaded bushing whereby stepwise rotation produces axial stepwise movement of said extension.

13. A printer as claimed in claim 10 in which the stepping motors are four phase stepping motors, the four phase current supply thereto being gated through a driver unit incorporating VMOS FET's having rise and fall times of less than ten nanoseconds.

14. A printer as claimed in claim 13 in which the circuit means includes a series input-parallel output shift register for controlling said driver unit, and the stepping motors.

15. A printer as claimed in claim 1 further including means for varying duration of said print current pulses.

16. A printer as claimed in claim 1 further including means for varying the ratio of the repetition frequency of said print current pulses to carriage step frequency.

17. A printer as claimed in claim 1 further including means for producing a preset number of carriage steps between consecutive steps of said paper stepping means and means for varying said preset number in responses to the nature of characters to be printed.

18. A method of operating the printer of claim 1 to maintain the carriage stepping motor in a slew mode of operation, the method comprising applying current to print resistors selected from a first sub-series of the series of print resistors to print a first line of pels, operating the paper stepping motor to step the paper, and applying current to print resistors selected from a second sub-series of print resistors to print a second line of pels, wherein the first and second sub-series includes a common third sub-series of print resistors and leading and trailing print resistors, respectively, immediately adjacent the third sub-series.

19. A method of operating the printer of claim 1 in which the carriage direction is periodically reversed, the carriage being stepwise driven in a slew mode between such direction reversals.

20. A method of operating the printer of claim 1 in which print current duration and/or intensity to individual print resistors is modified so that print density of said pels is uniform throughout the series.

21. A printer as claimed in claim 1 further comprising a control facility, said control facility including a universal synchronous asynchronous receiver transmitter (USART) for receiving incoming data and for transferring it to a buffer memory.

22. A printer as claimed in claim 21 in which the control facility includes a character generator (CG) in which incoming encoded data is converted to a form suitable for generating print pulses.

* * * * *